United States Patent

Farr

[11] 4,241,583
[45] Dec. 30, 1980

[54] FLUID-PRESSURE OPERATED SERVO-MOTOR ASSEMBLIES FOR VEHICLE BRAKING SYSTEMS

[75] Inventor: Glyn P. R. Farr, Leek Wootton, England

[73] Assignee: Girling Limited, Birmingham, England

[21] Appl. No.: 5,787

[22] Filed: Jan. 23, 1979

Related U.S. Application Data

[63] Continuation of Ser. No. 799,264, May 23, 1977, abandoned.

[30] Foreign Application Priority Data

May 22, 1976 [GB] United Kingdom ............... 21286/76

[51] Int. Cl.³ ............................................. B60T 13/20
[52] U.S. Cl. ...................................... 60/555; 60/594; 91/368
[58] Field of Search ...................... 60/547 R, 548, 552, 60/553, 555, 593, 594, 551; 303/114; 74/99 I, 110; 251/229, 251; 92/33; 91/368

[56] References Cited

U.S. PATENT DOCUMENTS

| | | | |
|---|---|---|---|
| 2,098,666 | 11/1937 | LaBrie | 60/551 |
| 2,229,247 | 1/1941 | Kamenarovic | 60/555 |
| 2,934,042 | 4/1960 | Stelzer | 60/551 |
| 3,075,395 | 1/1963 | Leland | 74/99 I |
| 3,319,925 | 5/1967 | Kojima | 92/33 |
| 3,664,130 | 5/1972 | Meyers | 303/114 |
| 3,989,223 | 11/1976 | Burkhardt | 92/33 |

Primary Examiner—Abraham Hershkovitz
Attorney, Agent, or Firm—Scrivener, Parker, Scrivener, Clarke

[57] ABSTRACT

In a servo-motor assembly for a vehicle braking system a valve controlling the servo pressure is operated by an operating assembly including a rotary valve actuator positioned between a pedal-operated input member and an abutment member. The valve actuator is axially movable through a limited distance and a camming mechanism translates axial movement of the actuator into angular movement which operates the valve.

8 Claims, 5 Drawing Figures

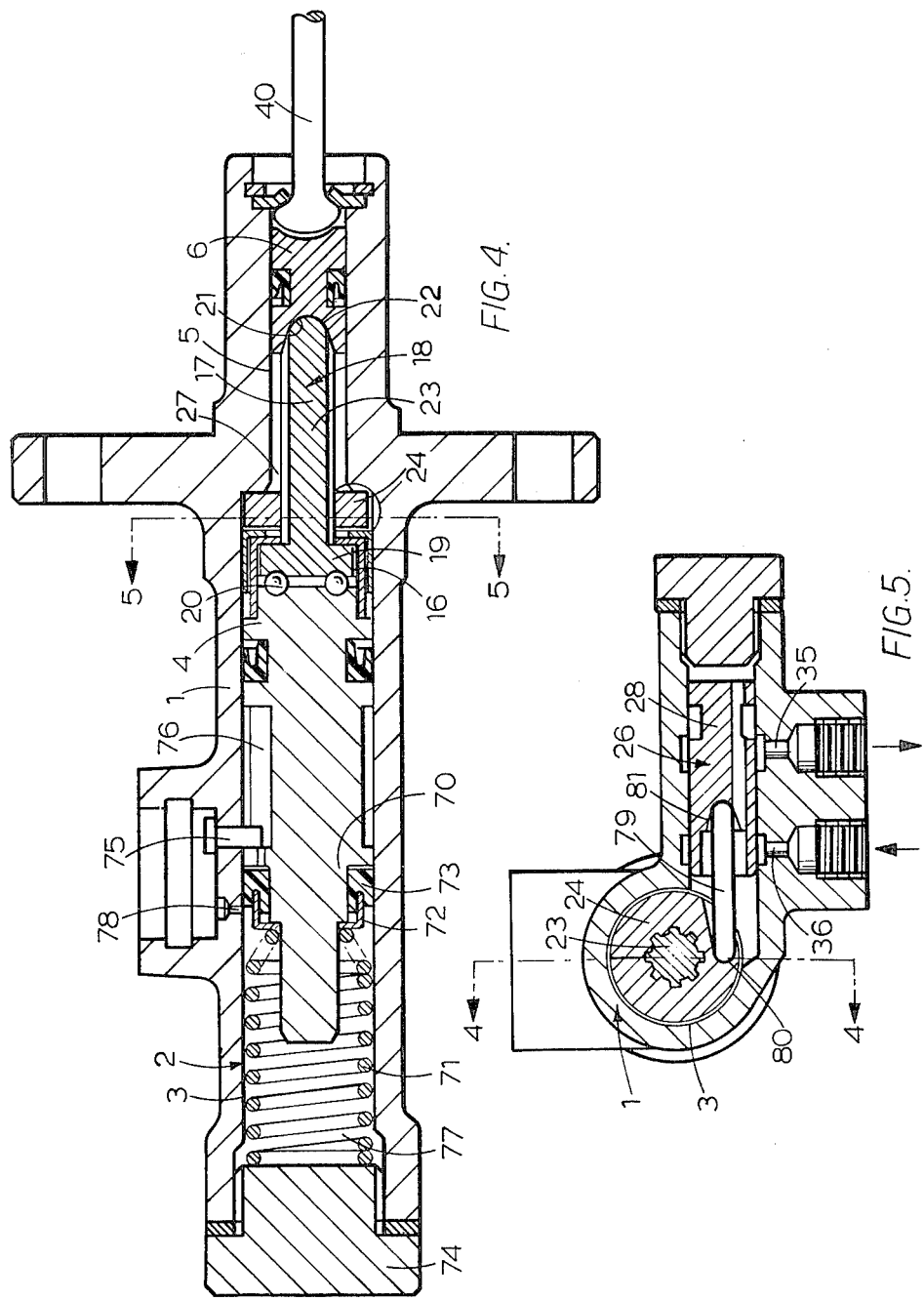

FLUID-PRESSURE OPERATED SERVO-MOTOR ASSEMBLIES FOR VEHICLE BRAKING SYSTEMS

This is a continuation of application Ser. No. 799,264, filed May 23, 1977 now abandoned.

SPECIFIC DESCRIPTION

This invention relates to fluid-pressure operated servo-motor assemblies for vehicle braking systems of the kind in which an effort from pedal-operated input member is transmitted to an output member through a movable wall in a housing and, when the servo-motor is operated, the effort is augmented by a fluid-operating pressure applied to the movable wall and controlled by valve means responsive to relative movement between parts of the assembly.

In one known booster assembly of the kind set forth in which the operating pressure is hydraulic and is supplied by a high pressure source, for example pump or hydraulic accumulator, the movable wall comprises a piston working in a bore in the housing and the pressure is applied to one end of the piston. In such a construction ideally the valve means should be located in a part of the assembly which is stationary, otherwise a moving connection, for example a hose, or seals under hydraulic pressure, will be required.

It has been proposed to utilise a lever to operate the valve means, in which the lever is pivoted about the valve means by means of a pivot to enable the valve means to be situated at a fixed location. In such a construction the travel of the input and output members differ by an amount determined by their respective distance from the pivot for the lever. Thus when the hydraulic fluid is cold, the input and output members travel together and then separate as the pressure applied to the movable wall increases. This applies an uncomfortable "kick back" to the pedal.

According to our invention in a servo-motor assembly of the kind set forth for a vehicle braking system the valve means is located in a stationary part of the housing, and is operated by an operating assembly located within the housing and comprising an abutment member for transmitting a force to the output member, rotary valve actuating means located between the input member and the abutment member, the rotary valve actuating means being angularly movable to operate the valve means and being movable axially with respect to the abutment member through a limited relative distance, and camming means for translating axial movement of the valve actuating means through said limited distance into angular movement thereof.

The valve actuating means may be operated to move angularly and operate the valve means at any point in a stroke of the output member.

The provision of the operating assembly enables the valve means to be situated at a fixed location without the provision of a lever and for the valve means to be operated in response to slight relative movement in an axial direction between the input and output members.

The valve means is operated as soon as a pedal load is applied to the input member.

Preferably the abutment member comprises at least a part of the movable wall so that when the servo-motor assembly is operated the wall tends to move relatively away from the input member thereby ensuring that the operating assembly is free from compressive forces and reducing frictional resistance between parts of the camming means to facilitate operation thereof.

Conveniently the actuating means comprises a thrust transmission member which is both axially and angularly movable, and a valve actuating member which acts on the valve means, is slidably connected to the transmission member, and is keyed against movement in an axial direction with respect to the housing.

Thus the slidable connection accommodates movement of the thrust transmission member when the servo-motor assembly is operated with no equivalent axial movement being imparted to the actuating member although the actuating member is angularly movable with the thrust transmitting member.

Preferably the abutment member and the thrust transmission member are in the form of pressure plates in adjacent faces of which are provided complementary inclined ramps with a ball co-operating with each pair of ramps in the plates. The ramps and the balls are arranged so that axial movement of the transmission member relative to the abutment member forces the balls relatively down the ramps and into recesses to cause the angular movement of the rotary valve actuating means.

Two embodiments of our invention are illustrated in the accompanying drawings in which:

FIG. 4 is a longitudinal section through a combined servo-motor and hydraulic master cylinder assembly taken substantially on the line 4—4 of FIG. 5; and FIG. 5 is a section on the line 5—5 of FIG. 4.

Figure 1:
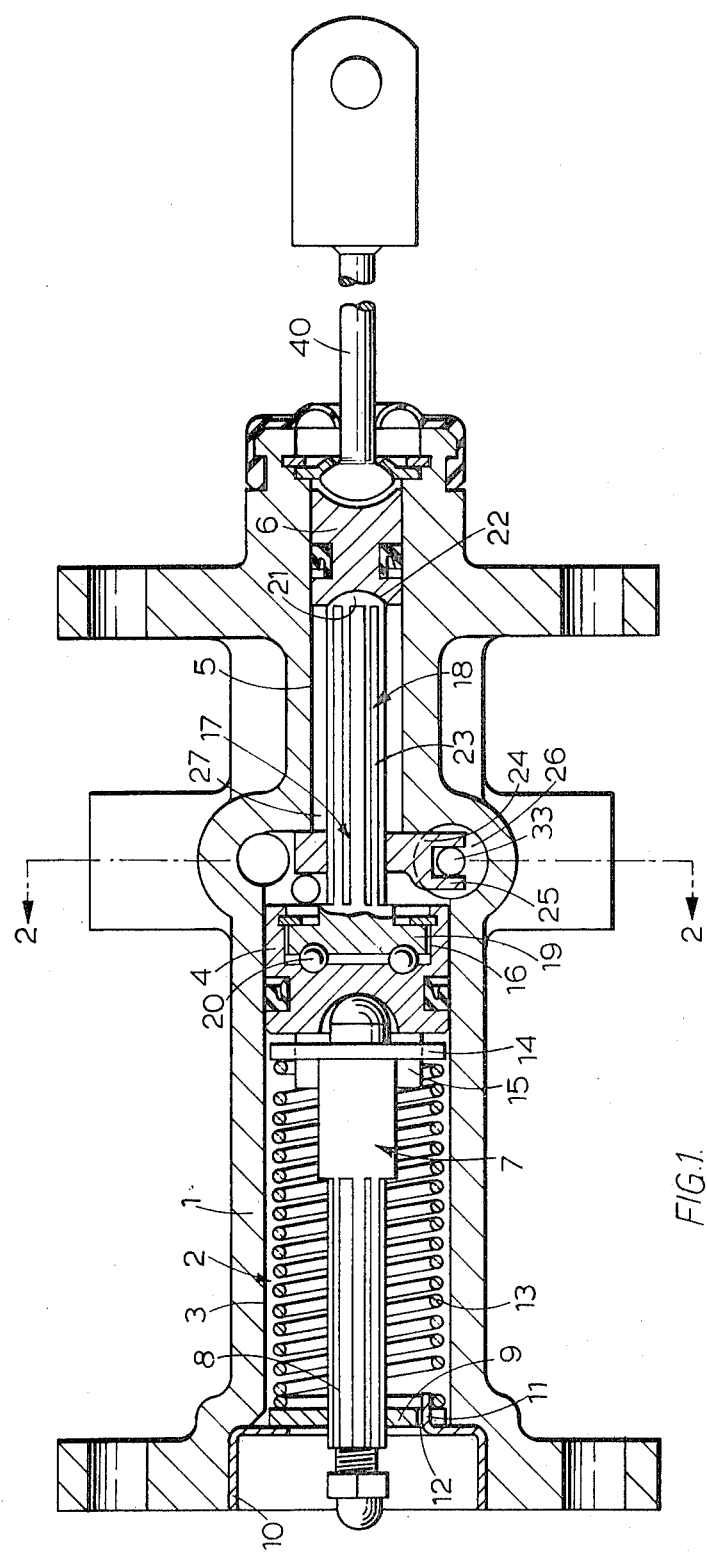
FIG. 1 is a longitudinal section through a servo-motor assembly taken substantially on the line 1—1 of FIG. 2.
Figure 2:
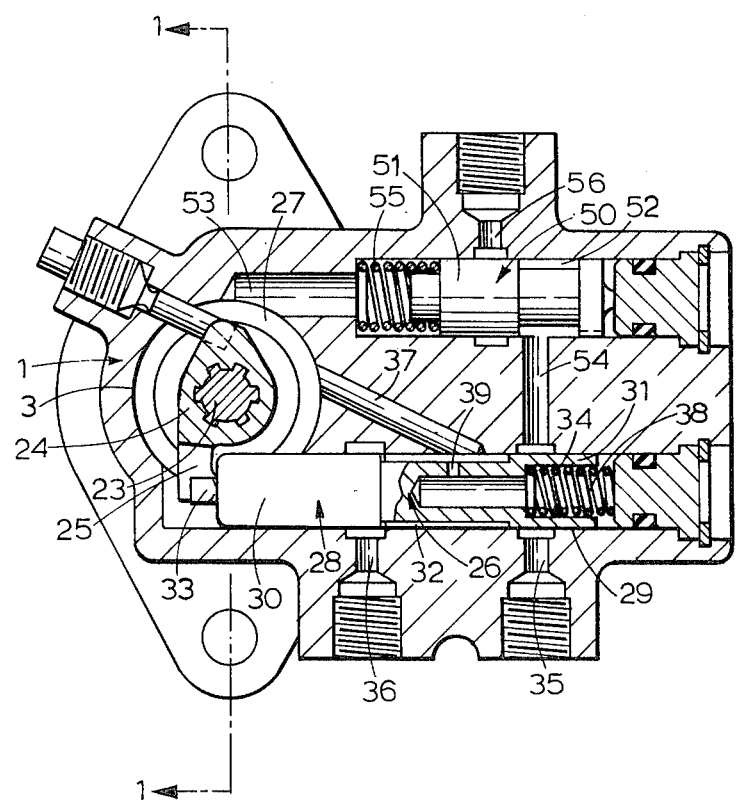
FIG. 2 is a section on the line 2—2 of FIG. 1.

The servo-motor assembly illustrated in FIGS. 1 and 2 of the drawings comprises a housing 1 provided with a stepped longitudinal bore 2 having a bore portion 3 of greater diameter in which works a boost piston 4 and a bore portion 5 of smaller diameter in which works an input piston 6. An output member 7, for actuating the piston of a master cylinder (not shown), has a free end portion 8 of splined formation guided to slide through an opening of complementary outline in an abutment plate 9, and the abutment plate 9 is in turn keyed against rotation with respect to the housing by means of a retainer 10 at the open end of the bore portion 3 and having projections 11 extending through openings 12 in the abutment plate 9. The abutment plate 9 forms an abutment for one end of a compression return spring 13 of which the other, inner end, abuts against a radial flange 14 on the output member 8 to urge the output member 8 into engagement with the boost piston 4 to which it is keyed against rotation by a key 15. Thus the boost piston 4 is keyed against rotation with respect to the housing.

The face of the boost piston 4 remote from the output member 8 is formed with a recess 16. Valve actuating means 17 disposed between the pistons 6 and 4 includes a thrust transmission member 18 provided at opposite ends with an enlarged head 19 which is retained in the recess 16 by a circlip and a part-circular formation 21 received in a part-circular recess 22 in the piston 6 to form an engagement of low friction therebetween. Balls 20 are arranged between pairs of ramps constituted by the sides of complementary recesses in the adjacent faces of the recess 16 and the head 19. The transmission member 18 has a splined stem 23 on which is slidably mounted a valve actuating member 24 including a bifurcated radial arm 25 for actuating valve means 26.

The valve means 26 control the application of pressure from a source to a boost chamber 27 defined by the bore portions between the pistons 6 and 4. As illustrated the valve means 26 comprises a spool 28 working in a plain blind bore 29 which is provided in the housing 1 in such a position that it is in communication with the boost chamber 27 and is tangential to the bore 2. The spool 28 includes two lands 30 and 31 which are working fits in the bore 29 and are interconnected by a portion 32 of reduced diameter, and a spigot 33 of reduced diameter which projects from the land 30 and is straddled by the bifurcated arm 25 to key the arm 25 against axial movement. A compression spring 34 urges the spool 28 into engagement with the arm 25. In an inoperative position, the land 31 closes a port 35 for connection to the source of hydraulic fluid under pressure, conveniently a pump or hydraulic accumulator, and an exhaust port 36 for connection to a reservoir for hydraulic fluid is in open communication with the boost chamber 27 through a passage 37 connecting the bore 29 to the bore 2, and with the hollow interior 38 of spool at the closed end of the bore 29 through a relief port 39.

When the servo-motor assembly is operated a force applied to the piston 6 from a pedal-operated input member 40 is transmitted through the transmission member 18 to the boost piston 4. Initially the piston 6 and the transmission member 18 are advanced against the force in the compression spring 13 and the friction of the seal of the piston 4. This movement is axial and relative to the piston 4 and forces the balls 20 down the ramps and into the recesses. Since piston 4 is keyed against rotation, the balls 20 cause rotation of the head 19 and transmission member 18 to cause the actuating member 24 and the arm 25 to move angularly with respect to the piston 4 and urge the spool 28 towards the closed end of the bore 29 against the force in the spring 34. Initial movement of the spool 28 in that direction causes the land 30 to close the port 36 and isolate the reservoir from the boost chamber 7, and further movement in the same direction causes the land 31 to open the port 35 to place the boost chamber 27 in communication with the source through the passage 37. Pressurisation of the boost chamber 27 which acts on the boost piston 4 augments the input force, and both pistons 4 and 6 move together to actuate the master cylinder.

When the pressure in the boost chamber 27 acting on the input piston 6 equals the applied load the two pistons 4 and 6 move slightly away from each other to permit the arm 25 to move angularly in the opposite direction and permit the spool 28 to move axially and close the port 35. The port 36 remains closed so that the servo-motor assembly is in a balanced or "null" position.

In this construction therefore the pressure acting on the boost piston 4 operates the master cylinder and that action on the piston 6 provides a pedal reaction or "feel."

When the pedal effort is reduced the input piston 6 moves further away from the piston 4, thereby allowing the spool 28 to move further in the bore 29 with the land 30 uncovering the exhaust port 36 to relief the pressure in the boost chamber 27.

If the hydraulic fluid is cold the servo response time will decrease so that operation of the valve means 26 is not immediately followed by rapid increase in pressure in the boost chamber 27. In such a case the pistons 4 and 6 move together with the port 35 fully exposed. As the pressure in the chamber 27 increases the pistons move further along the bore 2 until the pressure reacts on the input force as described above. This means that the brake pedal is not "kicked-back" as the pressure rises.

In the event of failure of the pressure sources, the master cylinder can be applied manually with the pedal force transmitted mechanically through the parts of the valve operating assembly which comprises the piston 4, and the transmission member 18.

In a modification a second spool valve 50 may be connected in parallel with the valve means 26. The spool valve 50 comprises a spool 51 working in a blind bore 52. The spool 51 is exposed at one end to pressure in the chamber 27 through a passage 53 and at the opposite end at all times to pressure from the source through a by-pass passage 54. A spring 55 biasses the spool 51 in a direction to close a port 36 for connection to a steering mechanism. Normally however, the port 56 is exposed so that pressure fluid is supplied to the steering mechanism.

When the servo-motor assembly is operated both ends of the spool 51 are subjected to equal pressures so that, because of the loading of the spring 55, the spool 51 is urged outwardly to close the port 56 and provide priority to the boost chamber 27 from the source.

The servo-motor assembly described above is "input reactive." That is to say the operation of the valve means and generation of "feel" depends on a signal from the input member.

Figure 3:
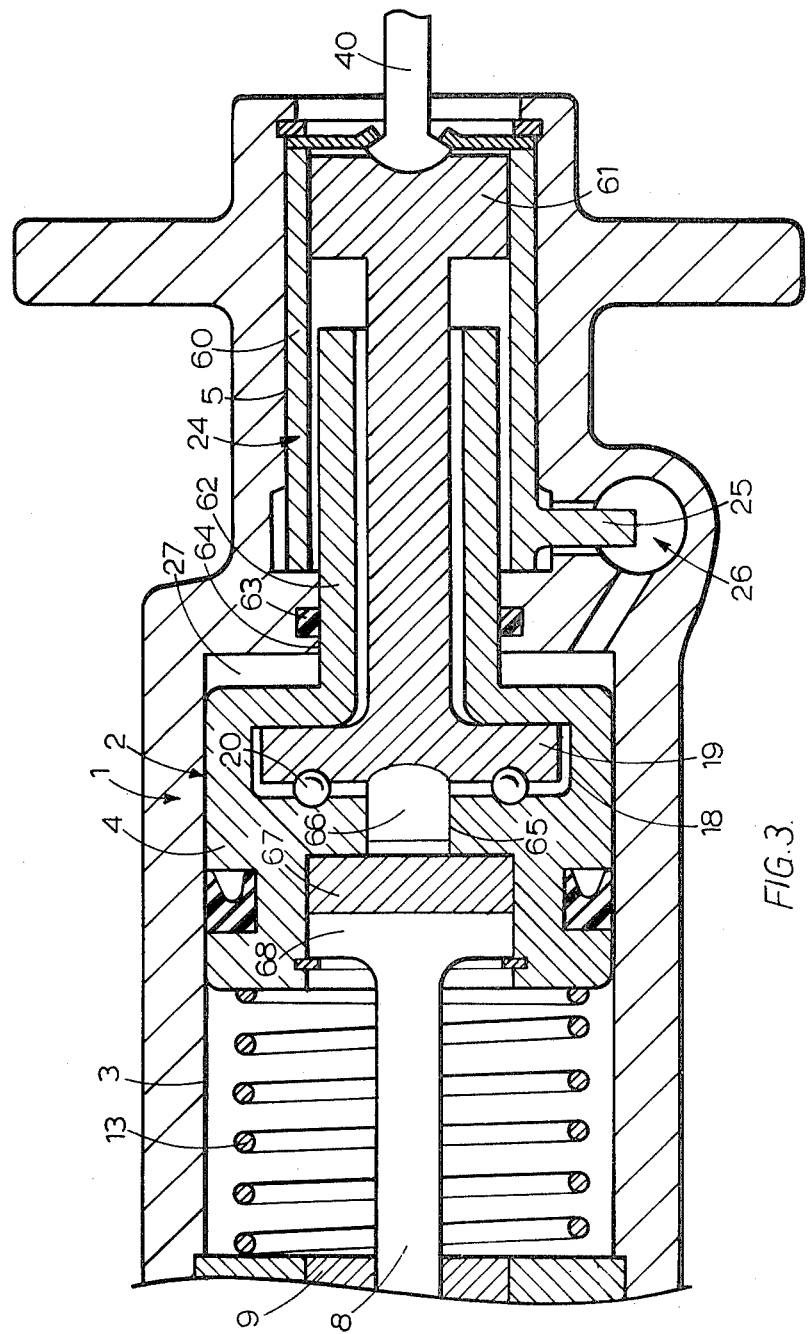
FIG. 3 is a section similar to FIG. 1 of a modified servo-motor assembly.

The servo-motor assembly illustrated in FIG. 3 is "output reactive." That is to say the operation of the valve means and generation of feel depends on a signal generated by a reaction from a member being operated, for example the piston of the master cylinder.

In the servo-motor assembly illustrated in FIG. 3 the valve operating member 24 comprises an internally splined sleeve 60 of substantial length and the stem of the transmission member is of plain diameter being formed at its outer end for engagement by the input member 40 through the low friction engagement with an enlarged splined head 61 slidably received in the sleeve 60.

The piston 4 is incorporated into a stepped assembly of which the smaller diameter portion 62 works through a seal 63 in a bore portion 64 of intermediate diameter and the boost chamber 27 is defined by the bore portions between the seal 63 and the seal on the piston 4. The piston 4 is keyed against rotation by a radial peg (not shown) in the housing, which works in a longitudinal groove in the piston 4.

The piston 4 has a longitudinal bore 65 in which a tappet 66 engaging with the head 19 is slidably guided, and a resiliently deformable block 67 is located in a recess in the piston 4 between the tappet 66 and an enlarged head 68 at the inner end of the output member 8.

When the servo-motor is operated the force from the pedal 40 moves head 61 axially, and since piston 4 is keyed against rotation balls 20 cause rotation of head 19 and head 61, which in turn rotates sleeve 60 to operate the valve actuator. Rotation of head 61 does not affect pedal 40 due to the part-spherical low friction engagement between them. The force from pedal 40 is therefore transmitted to the output member 8 through the tappet 66 and the block 67 which provides an output reaction signal controlling operation of the valve means 26.

The construction and operation of the servo-motor assembly of FIG. 3 is otherwise the same as that of FIGS. 1 and 2, and corresponding reference numerals have been applied to corresponding parts.

In the embodiment of FIGS. 4 and 5 the servo-motor illustrated in FIGS. 1 and 2 is modified and is combined into a single assembly with an hydraulic master cylinder embodied in the housing 1. As illustrated the output member 7, abutment plate 9, retainer 10, return spring 13 and the flange 14 are omitted and the boost piston 4 is extended longitudinally to provide an integral hydraulic piston 70 working in the bore portion 3, and a return spring 71 acts between a retainer 72 for the seal 73 on the piston 70 and a plug 74 closing the open end of the bore portion 3.

A piston assembly comprising both integral pistons 4 and 70 is keyed against rotation with respect to the housing by means of a radial peg 75 received in a longitudinally extending groove 76 in the piston assembly.

A pressure space 77 defined in the bore portion 3 between the piston 70 and the plug 74 is normally in communication with an hydrostatic reservoir for fluid through a recuperation port 78 in the wall of the housing 1. When the piston 70 is advanced in the bore portion 3 the seal 73 first closes the port 78 to isolate the pressure space 77 from the reservoir and subsequent movement of the piston 70 in the same direction pressurises the fluid in the pressure space which is supplied to an hydraulic actuator of a wheel brake to supply that brake.

The valve means 26 are operated by a thrust member dolly 79 acting between a recess 80 in the actuating member 24 and a recess 81 in the spool 28.

The construction and operation of the embodiment of FIGS. 4 and 5 is otherwise the same as that of FIGS. 1 and 2, and corresponding reference numerals have been applied to corresponding parts.

In a modification the master cylinder may be of tandem construction with the housing 1 extended to provide a longer bore portion 3 in which works a secondary piston. In such a construction the pressure space 77 is defined between the piston 70 and the secondary piston, and a secondary pressure space is defined between the secondary piston and the plug 74.

In a modification of the constructions described above the camming means for transmitting axial movement into angular movement may comprise a fast thread or a helical cam. Also the boost chamber 27 may be connected to the hydraulic actuators of other brakes which are therefore actuated when pressure fluid is admitted into the boost chamber 27.

Although, in the embodiments described above the servo-motor assembly is operated from a supply of hydraulic fluid under pressure, in other constructions the servo-motor assembly can equally be operated pneumatically.

I claim:

1. A servo-motor assembly for a vehicle braking system comprising a housing having a bore, an output member and a pedal-operated input member working in said bore, means through which an effort from said input member is transmitted to said output member, said means comprising a movable wall working in said bore, means for applying a fluid-operating pressure to said movable wall to augment said effort, valve means located in said housing for controlling said fluid-operating pressure applying means, an operating assembly located within said housing for operating said valve means, said operating assembly comprising abutment means for transmitting a force to said output member, rotary valve actuating means located between said input member and said abutment means, said rotary valve actuating means being angularly movable to operate said valve means and being movable axially with respect to said abutment means through a limited relative distance, said abutment means and said rotary valve actuating means being in the form of pressure plates in adjacent faces of which are provided complementary inclined ramps with a ball co-operating with each pair of ramps in said plates, said ramps and said balls comprising means arranged so that axial movement of said rotary valve actuating means relative to said abutment means forces said balls relatively down said ramps to cause said angular movement of said rotary valve actuating means.

2. A servo-motor assembly as claimed in claim 1, wherein said abutment means comprises at least a part of said movable wall so that when said servo-motor assembly is operated said wall tends to move relatively away from said input member.

3. A servo-motor assembly as claimed in claim 1, wherein said actuating means comprises a thrust transmission member which is both axially and angularly movable, and a valve actuating member which acts on said valve means is connected to said transmission member such that said transmission member is slidable axially relative to said valve actuating member, said valve actuating member being keyed against movement in an axial direction with respect to said housing.

4. A servo-motor assembly as claimed in claim 1, wherein said movable wall has a recess defining said abutment means and said rotary valve actuating means has an enlarged head located in said recess, retaining means retaining said head in said recess, said ramps being located in adjacent faces of said abutment means and said head.

5. A servo-motor assembly as claimed in claim 4, wherein said movable wall has a longitudinal bore extending through said face of said recess, and tappet means engaging at one end with said head is slidably guided in said bore and engages said output member at its other end to feed an output reaction back to said input member.

6. A servo-motor assembly as claimed in claim 1, wherein said housing has a tangential bore, said tangential bore having an outlet port for connection to a reservoir and an inlet port for connection to a source of fluid under pressure, and said valve means comprises a spool working in said tangential bore which is acted on at its innermost end by said valve actuating means to urge said spool relatively outwardly initially to close said outlet port thereafter to open said inlet port and cause said fluid under pressure to be applied to said movable wall.

7. A servo-motor assembly as claimed in claim 1, wherein said output member comprises a piston extension of said movable wall working in said bore in said housing, and said piston extension and bore comprise part of a master cylinder assembly incorporated in said housing for supplying fluid under pressure to a wheel brake actuator.

8. A servo-motor assembly as claimed in claim 1, incorporating means defining a boost chamber in said bore, said fluid-operating pressure being applied to said movable wall through said boost chamber, wherein said operating assembly is located in said boost chamber.

* * * * *